United States Patent [19]

Bernstein et al.

[11] 3,937,750

[45] Feb. 10, 1976

[54] PERFLUORO COMPOUND-SOIL RESISTANT EPOXY RESIN COMPOSITIONS

[75] Inventors: Philip Bernstein, Yardley, Pa.; John P. Stirpe, Trenton, N.J.

[73] Assignee: ESB Incorporated, Philadelphia, Pa.

[22] Filed: Dec. 12, 1973

[21] Appl. No.: 426,611

[52] U.S. Cl... 260/830 TW; 260/47 EP; 260/37 EP; 260/830 R
[51] Int. Cl.$^2$.......................................... C08G 45/00
[58] Field of Search......... 260/830 R, 830 TW, 835, 260/47 EP

[56] References Cited
OTHER PUBLICATIONS
Chem. Abstract Vol. 76, 1972.

Primary Examiner—Donald E. Czaja
Assistant Examiner—T. Pertilla
Attorney, Agent, or Firm—N. J. Masington, Jr.; R. H. Robinson; A. J. Rossi

[57] ABSTRACT

Perfluoro compound-epoxy resin compositions manifesting oil and soil resistance said compositions comprising an epoxy resin and a block copolymer of the type [ABA]$_n$ wherein A is a perfluoro group having from 8 to 10 carbon atoms, B is a low molecular weight functionality reactive with the epoxy resin and $n$ is from 1 to about 5.

10 Claims, No Drawings

PERFLUORO COMPOUND-SOIL RESISTANT EPOXY RESIN COMPOSITIONS

BACKGROUND OF THE INVENTION

1. Field of the Invention

This invention relates to oil and soil resistant compositions. More specifically this invention relates to perfluoro compound-epoxy resin compositions wherein the perfluoro compound is a block copolymer of the type $[ABA]_n$ wherein A is a perfluoro group having from 8 to 10 carbon atoms; B is a low molecular weight functionality capable of reacting with the epoxy resin and chemically participating in the cure of the epoxy resin; and n is from one to about 5.

The perfluoro compound-epoxy resin compositions of this invention are particularly useful as binders for particulate aggregate systems and as surface topcoats for various substrates.

2. Description of the Prior Art

Dirt or soil is an undesirable agent which becomes attached to or detrimentally alters the appearance of a surface. The soils may be dry and particulate or composite of fluid and particulate matter. They may be aqueous, oil or airborne.

In light of recent detailed studies with respect to the destructive effects of dirt, grime and air pollutants on the internal and external surfaces of buildings, attention has been turned to the development of surfaces resistant to such soil.

Perfluoro compound-epoxy resin compositions have now been discovered which manifest outstanding soil and oil resistant properties and which are extremely effective as binders for particular aggregate systems or as surface topcoats for various substrates.

SUMMARY OF THE INVENTION

This invention is directed to perfluoro compound-epoxy resin compositions comprising an epoxy resin having more than one vicinal epoxy group in each molecule and a block copolymer of the type $[ABA]_n$ wherein A is a perfluoro group having from about 8 to about 10 carbon atoms, B is low molecular weight functionality reactive with the epoxy resin and n is from one to about 5.

DESCRIPTION OF THE INVENTION

Increasing the fluorine content of perfluoro carbon compounds lowers the critical surface tension of the particular compound. It is this property that gives fluoronated surfaces their utility in antisoiling and dirt resistant applications. This can be readily seen by reference to Table I below which shows the critical surface tension in dynes per centimeter of polyethylene and halogenated polyethylenes of various chlorine and fluorine content.

TABLE I

| Polymer | Structure | Critical Surface Tension (dynes/cm) |
|---|---|---|
| Polyvinyledene Chloride | (-CH$_2$-CCl$_2$-)$_3$ | 40 |
| Polyvinyl Chloride | (-CH$_2$-CHCl-)$_3$ | 39 |
| Polyethylene | (-CH$_2$-CH$_2$-)$_3$ | 31 |
| Polyvinyl fluoride | (-CH$_2$-CHF-)$_3$ | 28 |
| Polyvinyledene fluoride | (-CH$_2$-CF$_2$-)$_3$ | 25 |
| Polytrifluoroethylene | (-CHF-CF$_2$-)$_3$ | 22 |
| Polytetrafluoroethylene | (-CF$_2$-CF$_2$-)$_3$ | 18 |

The perfluoro compounds useful in this invention are block copolymers of the type $[ABA]_n$. A in the block copolymer formula is a perfluoro group having from 8 to 10 carbon atoms. While both longer and shorter carbon chains can be used effectively to form the backbone of the perfluoro group, a chain of from about 8 to 10 carbon atoms has been selected for practical purposes such as ease of handling and availability. B of the block copolymer formula is a low molecular weight functionality (maximum molecular weight being about 300 - 3,000) reactive with the epoxy resin. By the phrase "reactive with the epoxy resin" as used herein is meant any functionality which is capable of reacting with the epoxy resin in such a way as to chemically participate in the curing of the epoxy resin at room temperature. B of block copolymer is derived from a compound having at least two functionalities, i,e. having at least sufficient stochiometry to fulfill the functions of two active hydrogens. This will be necessary to insure both the ready formation of the block copolymer itself and the reaction of the block copolymer with the epoxy resin during cure. Suitable compounds from which B may be derived or produced include polyethers, polyamines, carboxyls, hydroxyls, and anhydrides and the like. The value of n may be from one to about 5 in order to maintain the desired low molecular weight of the resultant block copolymer since an extremely high molecular weight would tend to reduce the overall effect of the perfluoro group present in the copolymer. An $n$ value of 2 or 3 is preferred.

The block copolymer may be prepared by reacting hexafluoropropylene with iodine to produce an iodide and then reacting the resultant iodide with the B producing compound to give ABA + H + HI. The perfluoro group will comprise from about 25 to about 80% by weight of the block copolymer.

Particular perfluorocompounds which may be used in the compositions of the instant invention include those listed in Table II below.

TABLE II

| Designation* | Name | Structure |
|---|---|---|
| 1. "TEF-3" | Perfluoro aromatic Diester | $(-C_{10}F_{21})$ |
| 2. "TEF-6" | Perfluoro modified Aliphatic Hydrocarbon | $(-C_{10}F_{21})$ |
| 3. "TEF-8" | Polyether Adipate Derivative | $(-C_{10}F_{21})$ |
| 4. "TEF-16" | Fluorocarbon Polyether | $(-C_xF_{17})$ |
| 5. "TEF-31" | Perfluoro Modified Epoxide | $(-C_{10}F_{21})$ |
| 6. "TEF-36" | Hydroxyl containing Perfluoro Polymer | $(-C_{10}F_{21})$ |
| 7. "RT-772" | Perfluoro Alkylated Aromatic Ester | $(-C_xF_{17})$ |
| 8. "ZC-643" | Perfluoro Alkyl Polyether | $(-C_xF_{17})$ |

*all designated compositions are products of Thiokol Corporation.

Organic resins recommended for use according to this invention consist essentially of epoxy resin compositions, which may be a single such resin with a well-defined molecular weight or a mixture of one or more resins in two or more ranges of molecular weight. The resin compositions preferably are liquid at room temperature (e.g., 25° C).

A suitable epoxy resin is the diglycidyl ether of bisphenol A, normally formed as a condensation product of epichlorohydrin and bisphenol A [i.e., bis(4-hydroxyphenyl) dimethyl methane]. Condensation products of epichlorohydrin with other polyhydric alcohols, which may or may not have such symmetry, also can be used, either in monomeric state or at relatively low degrees of polymerization, as suggested. Examples of additional suitable resins are the diglycidyl ether of bisphenol F (i.e., bis (4-hydroxyphenyl) methane and the allyglycidyl mixed diether of bisphenol A.

The perfluoro compound and the epoxy resin may be mixed by any appropriate means. For example, the epoxy resin may be added to the perfluoro compound and the resultant mass can be heated with stirring until the two components are carefully mixed and the perfluoro compound has melted and dissolved. The perfluoro compound block copolymer will comprise from about 0.5 to about 10 weight % of the perfluoro compound-epoxy resin composition, preferably about 2%.

After the mixture of perfluorocompound and epoxy resin have cooled to room temperature the required amount of hardener is added and thoroughly mixed therein. A basic polymerization hardener (cross-linking agent) is preferred, such as a poly-functional primary or secondary amine. Poly-functional phenols may also be used, as may polysulfide. An example of a satisfactory hardener is 2,4,6-tridimethyl aminoethyl phenol. Other examples of hardeners for the epoxy resin or resins used according to this invention, as well as of the resins themselves, will readily occur to those skilled in the art. The amount to be added will depend on the hardener used and the end use of the composition will be readily ascertained by one skilled in the art. The resultant mixture is a perfluoro-compound-epoxy resin composition having outstanding soil and oil resistant qualities which it is capable of imparting to surfaces when applied to such surfaces as a topcoat.

If desired, an aggregate powder may be added to the mixture obtained above and mixed until uniform in appearance. The amount, (if any), composition, and particle size of the aggregate will depend at least in part upon characteristics required in the end use to which the ultimate hardened composition is to be put. Typical of the aggregates which may be added are stone, sand, pebbles and the like.

Other new compositions such as ultraviolet absorbers may be added depending upon the end use of the composition in amount readily determinable by those skilled in the art.

The resultant mixture will manifest numerous advantages over similar epoxy resin-aggregate compositions which do not contain the perfluorocompound set forth herein. Such advantages include more uniform mixing of the compositions, easier troweling or application of the resultant composition, greater flexibility of the cured resin, and most unexpectedly a reduction of the cure time. Tests have shown that while a control epoxy resin system containing no fluorocarbon cured in 16 – 18 hours, the same system containing a perfluoro compound according to this invention cured in 3 – 4 hours under the same conditions.

The perfluoro compound epoxy resin composition, whether or not it contains the aggregate powder, can be readily applied to the desired surface (e.g. cinder block, concrete, wood, metal, and the like) by any means known in the art, for example troweling. The composition will then proceed to cure fully at room temperature.

EXAMPLES

The following examples are intended to be merely illustrative of the invention and not in limitation thereof. Unless otherwise indicated, all quantities are by weight.

EXAMPLE 1

Preparation of Perfluoro Compound-Epoxy Resin Composition

Into a standard aluminum weighing dish, the required amount of perfluoro compound was added to the nearest 0.0001 g. Concentrations of 1 percent, 2 percent, 3 percent and 4 percent of perfluoro compound based on the weight of the coating resin were used (see Table III). The resin ("EPIREZ 510") weight in this case was 5.0 gms for each compound prepared. The resin was added to the perfluoro compound, and the aluminum container was placed on a hot plate preheated to a surface temperature of approximately 80°C. Using a small, polished glass rod, the two components were completely mixed until the perfluoro compound melted and completely dissolved.

The mixture of perfluoro compound and resin cooled to room temperature and the required amount of hardener was added (1.0 gm each compound) and thoroughly mixed. An aggregate powder was then added (13.0 gm) and mixed until the mixture was uniform in appearance. Control samples were made by mixing in the resin, hardener and aggregate powder in the same order but at room temperature.

Using a Teflon coated sheet, 3 in. by 4 in. spaces were marked off, ¾ in. masking tape was used for this. A sufficient amount of mixture to fill the 3 in. by 4 in. space, about 8–10 gms for each space, was troweled on. The mixture was leveled and smoothed out. When a uniform surface was obtained, the sample was allowed to stand at room temperature (25°C–26°C) to fully cure.

After the samples were completely cured, each 3 in. by 4 in. sample panel was removed from the Teflon surface for wettability and stain removal testing.

TABLE III

VARIOUS PERFLUORO COMPOUNDS USED AND THEIR CONCENTRATIONS

| Sample No. | Compound | % Additive Level |
|---|---|---|
| 31-A | TEF-31 | 1 |
| 31-B | TEF-31 | 2 |
| 31-C | TEF-3 | 1 |
| 31-D | TEF-3 | 2 |
| 31-E | TEF-6 | 1 |
| 31-F | TEF-6 | 2 |
| 31-G | TEF-8 | 1 |
| 31-H | TEF-8 | 2 |
| 32-A | ZC-643 | 1 |
| 32-B | ZC-643 | 2 |
| 32-C | RT-772 | 1 |
| 32-D | RT-772 | 2 |
| 32-E | TEF-16 | 1 |
| 32-F | TEF-16 | 2 |
| 32-G | TEF-8 | 1 |
| 32-H | TEF-8 | 2 |
| 33-A | TEF-8 | 3 |
| 33-B | TEF-8 | 4 |
| 33-D | TEF-8 | 3 |
| 33-F | TEF-16 | 3 |
| 33-G | TEF-16 | 4 |
| 34-A | RT-772 | 3 |
| 34-B | RT-772 | 4 |
| 34-C | TEF-3 | 3 |
| 34-E | ZC-643 | 3 |
| 34-F | ZC-643 | 4 |

EXAMPLE 2

Oil Wetting Test

The following test procedure was used to determine the wetting characteristics of the sample panels of Example 1. Basic Oil Test Solutions were prepared each comprising:

a) "PENNZOIL" SAE 10W motor oil
b) Heptane Solvent — Commercial Grade
c) Methyl Blue Indicator — Powder

Preparation of Test Solutions

Eleven concentrations of motor oil and heptane solvent were prepared, ranging from 0 percent oil to 100 percent oil by volume in the following manner:

Into a 7 dram glass vial, the required concentration of motor oil and heptane solvent were mixed directly, using small, magnetic stirrer and micro stirring bar. Into each vial, as it was being mixed, a few grains of the Methyl Blue indicator powder were added until a dark blue solution was obtained. Each solution was mixed for approximately 5 minutes to insure a uniform solution. All vials were capped during stirring. Each glass vial contained exactly 10 mls of test solution.

Procedure for Staining Test

Using a standard 2 ml medicine dropper, two uniform drops of the test solution were deposited on each panel prepared according to Example 1. Each drop was dropped directly upon the other and the tip of the dropper was held as close as possible without touching the first droplet. The uniformity of the height from which the solution dropped was very important because it determined the initial size of the droplet upon the surface. The droplet size can also be adversely affected by irregularities of the sample surface that causes the droplet to take an abnormal shape or spread erratically on the surface.

Measurement of Droplet

Measurements were taken on each two-drop oil stain in order to determine the wetting characteristics of each sample at the various concentrations of the oil/heptane solution.

The measurements in each case were obtained using a pair of calipers. The diameter of the drop pattern was taken and recorded in 1/32ths of an inch increments. The caliper points were placed as close as possible to both sides of each droplet pattern to obtain a measurement. Care must be taken at this step to insure that the tool points do not touch the droplet pattern itself as this could change the dimension of the droplet by disturbing it. The samples for the test must be placed on a level surface for accuracy. The results of the test appear in Table IV and show that the degree of wettability varies with variations in perfluoro compound used and perfluoro compound concentrations.

TABLE IV

DIAMETER OF STAIN OF VARIOUS COMPOSITIONS
SOLUTION COMPOSITION [Motor Oil in HEPTANE]

| Sample No. | 0% | 10% | 20% | 30% | 40% | 50% | 60% | 70% | 80% | 90% | 100% |
|---|---|---|---|---|---|---|---|---|---|---|---|
| 31A | 11/32 | 14/32 | 12/32 | 11/32 | 9/32 | 13/32 | 12/32 | 12/32 | 13/32 | 12/32 | 12/32 |
| 31B | 14/32 | 11/32 | 9/32 | 9/32 | 10/32 | 13/32 | 12/32 | 11/32 | 12/32 | 11/32 | 11/32 |
| 31C | 15/32 | 10/32 | 8/32 | 9/32 | 9/32 | 8/32 | 9/32 | 8/32 | 8/32 | 9/32 | 9/32 |
| 31D | 12/32 | 13/32 | 8/32 | 8/32 | 8/32 | 10/32 | 8/32 | 8/32 | 8/32 | 10/32 | 10/32 |
| 31E | | 1-1/2" | 1-1/4" | 1-1/2 | 18/32 | 20/32 | 16/32 | 16/32 | 14/32 | 27/32 | No Space |
| 31F | 21/32 | 18/32 | 13/32 | 13/32 | 11/32 | 13/32 | 12/32 | 12/32 | 12/32 | 12/32 | |
| 31G | 11/32 | 11/32 | 9/32 | 8/32 | 8/32 | 8/32 | 8/32 | 8/32 | 8/32 | 9/32 | 12/32 |
| 31H | 11/32 | 9/32 | 7/32 | 8/32 | 8/32 | 8/32 | 11/32 | 9/32 | 9/32 | 12/32 | 12/32 |
| 32A | 1-1/2" | | | 18/32 | 24/32 | 18/32 | 19/32 | 17/32 | 17/32 | No Space | No Space* |
| 32B | 1-1/2" | | 21/32 | 17/32 | 17/32 | 14/32 | 16/32 | 14/32 | 15/32 | No Space | No Space |
| 32D | 13/32 | 9/32 | 8/32 | 8/32 | 11/32 | 11/32 | 9/32 | 8/32 | 8/32 | 9/32 | 13/32 |
| 32C | 14/32 | 11/32 | 10/32 | 10/32 | 8/32 | 9/32 | 9/32 | 9/32 | 10/32 | 11/32 | 11/32 |
| 32E | 11/32 | 12/32 | 10/32 | 7/32 | 9/32 | 10/32 | 11/32 | 9/32 | 10/32 | 11/32 | 10/32 |
| 32F | 15/32 | 10/32 | 10/32 | 10/32 | 10/32 | 9/32 | 10/32 | 10/32 | 10/32 | 9/32 | 10/32 |
| 32G | 11/32 | 8/32 | 10/32 | 10/32 | 10/32 | 10/32 | 9/32 | 9/32 | 8/32 | 10/32 | 12/32 |
| 32H | 10/32 | 12/32 | 9/32 | 9/32 | 9/32 | 8/32 | 8/32 | 9/32 | 11/32 | 10/32 | 10/32 |
| 33A | 10/32 | 9/32 | 9/32 | 9/32 | 10/32 | 9/32 | 9/32 | 10/32 | 10/32 | 10/32 | 10/32 |
| 33B | 10/32 | 10/32 | 10/32 | 11/32 | 8/32 | 8/32 | 11/32 | 8/32 | 9/32 | 9/32 | 10/32 |
| 33D | 12/32 | 9/32 | 9/32 | 8/32 | 11/32 | 8/32 | 9/32 | 10/32 | 10/32 | 9/32 | 9/32 |
| 33F | 12/32 | 11/32 | 9/32 | 9/32 | 8/32 | 8/32 | 10/32 | 11/32 | 10/32 | 9/32 | 9/32 |
| 33G | 13/32 | 11/32 | 9/32 | 12/32 | 11/32 | 10/32 | 9/32 | 9/32 | 10/32 | 9/32 | 10/32 |
| 34A | 13/32 | 10/32 | 10/32 | 10/32 | 9/32 | 9/32 | 8/32 | 8/32 | 9/32 | 10/32 | 11/32 |
| 34B | 12/32 | 15/32 | 9/32 | 9/32 | 8/32 | 9/32 | 7/32 | 8/32 | 9/32 | 13/32 | 10/32 |
| 34C | 9/32 | 9/32 | 9/32 | 9/32 | 9/32 | 9/32 | 9/32 | 11/32 | 11/32 | 10/32 | 10/32 |
| 34E | >1-1/4" | | 22/32 | 19/32 | 19/32 | 20/32 | 21/32 | 17/32 | 16/32 | No Space | No Space |

TABLE IV-continued

| Sample No. | DIAMETER OF STAIN OF VARIOUS COMPOSITIONS SOLUTION COMPOSITION [Motor Oil in HEPTANE] | | | | | | | | | | |
| --- | --- | --- | --- | --- | --- | --- | --- | --- | --- | --- | --- |
| | 0% | 10% | 20% | 30% | 40% | 50% | 60% | 70% | 80% | 90% | 100% |
| 34F | >1-1/4" | 1" | 20/32 | 18/32 | 20/32 | 16/32 | 18/32 | 18/32 | 17/32 | No Space | No Space |
| CONTROL | >1-1/2" | >1-1/2" | 1-1/4" | 1-3/32" | >1-1/2" | >1-1/2" | >1" | >25/32 | >1-2/32" | >24/32 | |

*No space means that sample test area was completely stained by preceeding stain solutions.

EXAMPLE 3

Motor Oil Stain Removal

The following test was performed on the stained samples used previously in wetting test of Example 2 i.e. those having deposited on them drops of motor oil/Heptane solution with Methyl Blue indicator added for staining purpose.

Testing for Oil Stain Removal

All stained samples of Example 2 were first rinsed under hot running tap water to remove the heavy deposits of oil droplets. Then, all samples were placed in a bath containing sufficient "Sparkleclean" laboratory detergent and hot water to cover samples completely. The samples were cleaned in the bath for one-half hour, all samples were rinsed four times in water and they were then dried overnight in circulating oven at 40°C about 18 hours.

The dry samples were checked visually for degree of blue stain removal and the best removal results were manifested by samples 31A, 31B, 31E, 31G, 31H, 32A, 32B, 32E, 32F, 32G and 32H.

The foregoing detailed description has been given for clarity of understanding only and no unnecessary limitations are to be understood therefrom. The invention is not limited to exact details shown and described for obvious modification will occur to one skilled in the art.

The embodiments of the invention in which an exclusive property or privilege is claimed are defined as follows:

1. Perfluoro compound-epoxy resin compositions comprising an epoxy resin and a block copolymer of the type $(ABA)_n$ wherein A is a perfluoro group having from about 8 to about 10 carbon atoms, B is a low molecular weight functionality, derived from a compound having at least sufficient stoichiometry to fulfill the functions of two active hydrogens, which is reactive with the epoxy resin, and $n$ is from 1 to about 5 and wherein the block copolymer comprises from about 0.5 to about 10 weight percent of the perfluoro compound - epoxy resin composition, and more than one vicinal epoxy group is present in each epoxy resin molecule.

2. Compositions according to claim 1 wherein the molecular weight of B is from about 300 to about 3,000.

3. Compositions according to claim 1 wherein the perfluoro group A comprises from about 25 to about 80 weight percent of the block copolymer based on the total weight of the block copolymer $(ABA)_n$.

4. Compositions according to claim 1 wherein the perfluoro group A of the block copolymer comprises from about 25 to about 80 weight percent of the block copolymer $(ABA)_n$; the molecular weight of B is from about 300 to about 3,000; and the block copolymer comprises from about 0.5 to about 10 weight percent of the perfluoro compound-epoxy resin composition.

5. Compositions according to claim 1 comprising additionally a polymerization hardener.

6. Compositions according to claim 1 comprising additionally an aggregate powder.

7. Compositions according to claim 1 comprising additionally a polymerization hardener and an aggregate powder.

8. Compositions according to claim 4 comprising additionally a polymerization hardener.

9. Compositions according to claim 4 comprising additionally an aggregate powder.

10. Compositions according to claim 4 comprising additionally a polymerization hardener and an aggregate powder.

* * * * *